Frank E. Montroy,
Tom McGovern,
Joseph H. Gauthier and
Heskett I. Dawkins,
INVENTORS;

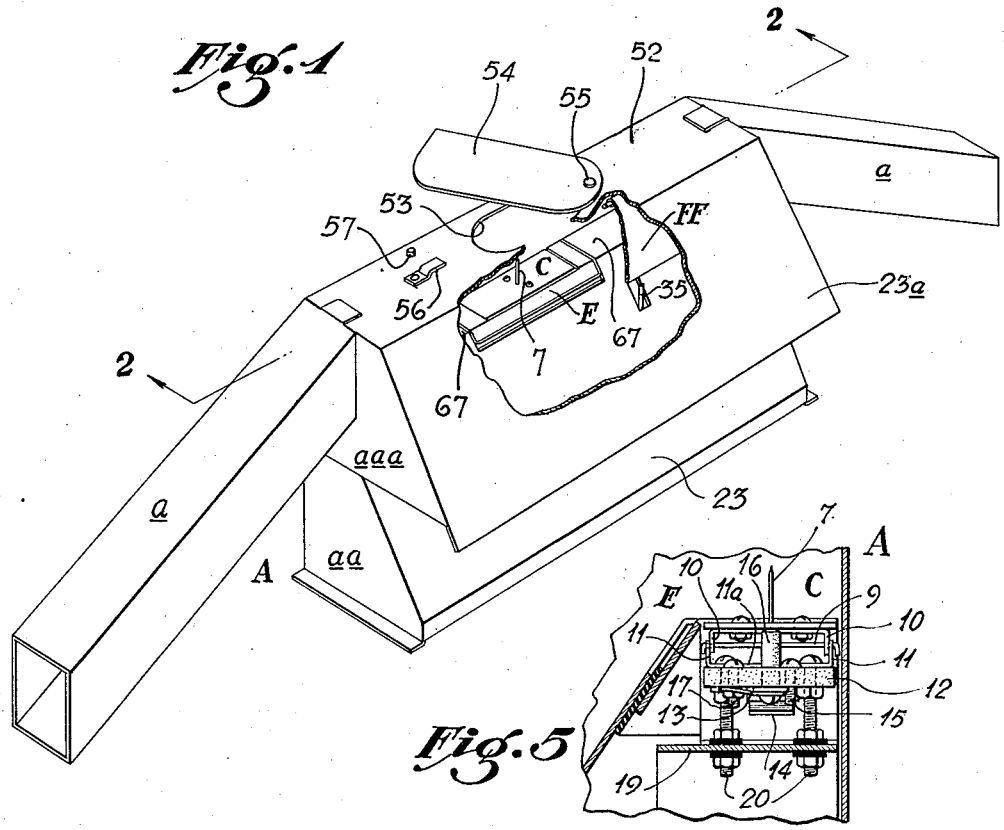
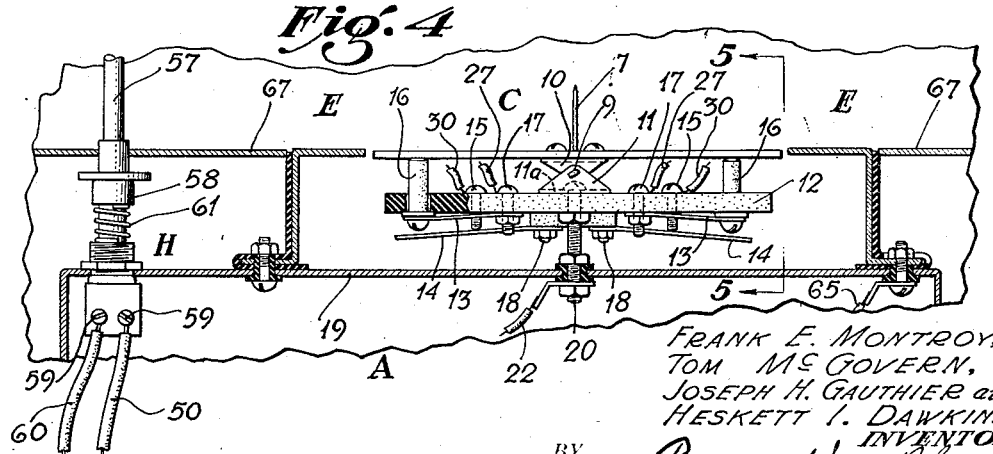

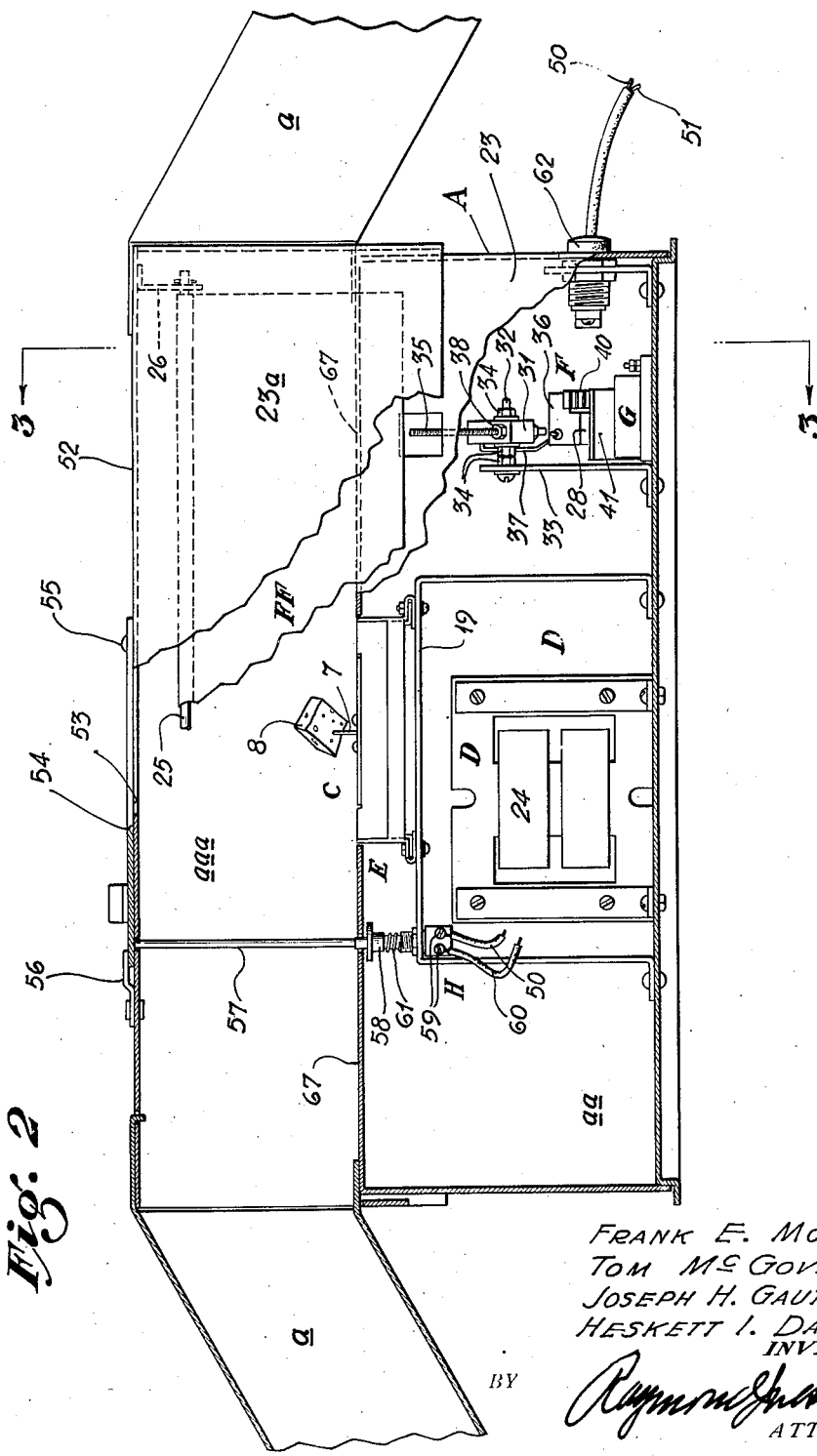

Patented Jan. 21, 1941

2,229,300

UNITED STATES PATENT OFFICE 2,229,300

EXTERMINATING APPARATUS

Frank E. Montroy, Tom McGovern, Joseph H. Gauthier, and Heskett I. Dawkins, Los Angeles, Calif., assignors to Electric Traps, Inc., Los Angeles, Calif., a corporation of California Application August 12, 1938, Serial No. 224,484

5 Claims. (Cl. 43—98)

This invention relates to exterminators, and more particularly to electrical exterminators for killing rodents and other animal life, and in certain respects the invention constitutes an improvement upon or departure from the subject-matter of another application for Letters Patent heretofore filed by one Benjamin F. Ford, Ser. No. 168,324, filed October 11, 1937, for Exterminating apparatus. In accordance with that invention and the present invention, the rodent or other animal to be exterminated is lured to a point at which a bait is disposed in connection with means and paths for causing and accommodating the passage of electricity to the point at which the bait is disposed, and whereby the animal, contacting at or near that point with circuit members, receives a boosted electrical current so increased through the agency of a suitable transformer associated with such electrical means and paths. Relay means are provided for causing the various circuit conditions, and means are likewise provided for preventing the exit of the animal until it has been exterminated, whereupon it is discharged from the apparatus and a path cleared for successive exterminations and the discharges of the killed rodents or other animals.

In said other invention the rodent or other animal was required to ascend a structure leading to the bait or lure. In accordance with the present invention, ramps or runways are provided leading gradually to the point at which the lure or bait is disposed, and the apparatus in toto may be conveniently disposed adjacent the baseboard of a room or in any other probable or natural path likely to be traversed by animals which it is desired to exterminate.

The invention has for its object the provision of an improved or reorganized apparatus of the character disclosed which will constitute a novel entity with attendant advantages, such as certainty of action, convenience in use and control, compactness in form, taken in conjunction with efficiency and effectiveness in service and relative simplicity and inexpensiveness.

The invention consists in the novel and useful provision, formation, combination, association and relative arrangement of parts, members and features all as hereinafter described, shown in the drawings and finally pointed out in claims.

In the drawings:

Fig. 1 is a perspective view of apparatus embodying the present invention in one form, the same being partly broken away for clearness of illustration;

Fig. 2 is an enlarged longitudinal section generally upon the line 2—2 of Fig. 1, and looking in the direction of the appended arrows, parts being broken away and parts being in elevation for clearness and fullness of disclosure;

Fig. 4 is a still further enlarged longitudinal sectional view taken upon the line 4—4, Fig. 3, and looking in the direction of the appended arrows;

Fig. 5 is a detail transverse sectional view taken upon the line 5—5, Fig. 4, and looking in the direction of the appended arrows.

Corresponding parts in all the figures are designated by the same reference characters.

Figure 6:
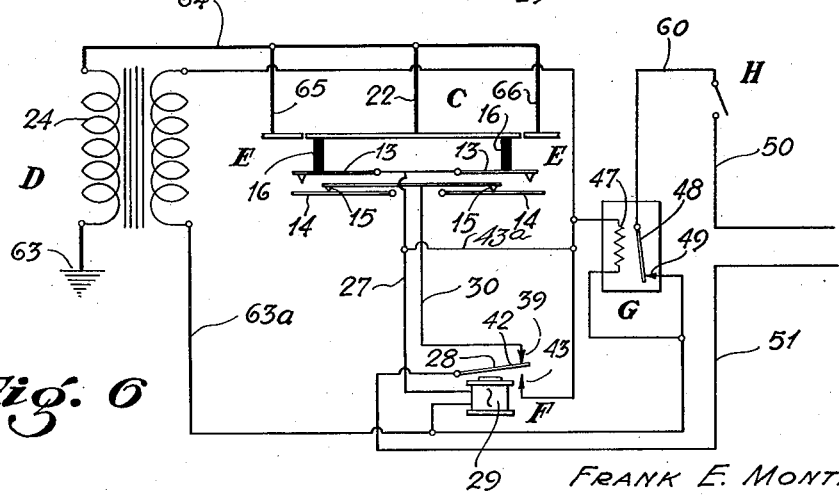
Fig. 6 is a diagrammatic view of electrical paths and units and devices utilized in the operation of the mechanism and apparatus disclosed in the other figures.

Referring with particularity to the drawings, we have shown the features and elements of the embodiment of the invention disclosed in the drawings as generally contained within a suitable casing A, which is provided at its ends with closed runways or ramps $a$ which lead to the zone in which the extermination of the animal is to be caused, whereby the rat or other animal may ascend either one of the ramps or runways $a$ and proceed to that zone, in which zone is provided a prong or other device 7 upon which may be impaled a lump of cheese 8 or other lure or bait. This prong 7 uprises from a trigger-plate C, which serves, as hereinafter pointed out, as a circuit maker for closing the electrical paths and setting into operation a sequence of electrical phenomena which will bring to the zone of the trigger-plate high tension electrical energy for the electrocution of the animal. This trigger-plate is pivotally mounted, as at 9, upon a rocker arm or pin which extends between ears 10 depending from the trigger-plate C and uprising spaced ears 11 mounted upon an insulating plate 12 which is mounted fixedly beneath such trigger-plate in the frame or casing and carries upper and lower leaf spring contact members 13 and 14, with the latter of which contact binding screws 15. The upper leaf springs 13 are carried by studs or insulating binding posts 16 and are disposed for engagement with the upper surfaces of the leaf springs 14. The leaf springs 13 are secured to binding posts 17, respectively, at an end of each, and the leaf contact springs 14 are secured by binding posts 18. These various parts and features are mounted upon and carried by the insulating plate 12, which in turn is mounted upon a frame member 19 by a pair of bolts 20 which are passed through the insulating plate 12 and through the base 11—a of a stirrup shaped member which includes the upstanding ears or cheek plates 11, and the heads of which bolts are brought to bear upon which base member. Bound to the lower extremity of one of these bolts 20 by a binding nut 21 is a wire or circuit member 22 which extends to the high potential side 24 of the transformer D and likewise to a circuit member E which embraces on three sides the trigger-plate C as clearly indicated in Fig. 1, such electrical paths being clearly indicated in Fig. 6.

The frame or casing A is provided with a bottom portion aa and a top portion aaa, to which top portion extend the runways a, and in which top portion likewise are mounted the trigger-plate C and the circuit member E, which are positioned so that the rat or other animal traversing the upper casing portion aaa will be caused to step in part upon such circuit member and in part upon such trigger-plate and thus close the circuit through the high tension transformer D and such trigger-plate as above indicated.

Likewise, the lower portion of the casing may have a downwardly inclined or slanted portion 23 and the upper casing portion a substantially parallel downwardly inclined casing portion 23a, forming a lateral discharge chute whereby the electrocuted rodent or other animal may be discharged from the casing and outwardly thereof. However, to prevent any inadvertent discharge of an animal only stunned and not dead, we provide a pivoted pendant gate member FF having an upper edge portion crimped over a rocking rod 25 rotatably carried in brackets 26 at the ends of the upper casing member. This gate is normally free to swing outwardly to the dotted line position shown in Fig. 3; but as soon as the animal contacts with the trigger-plate, a circuit is established through a relay device F to which an electrical path extends from either one of the upper contact springs 13, as at 27, and also to the armature 28 of the coil 29 from which extends an electrical path 30 from either of the binding screws 15 which contact with leaf springs 14. This causes the coil to attract the armature 28, oscillating a rocking arm 31 mounted upon a shaft 32 ranging laterally from the bracket 33 rising from the base portion of the casing A and threaded to receive a series of jam nuts 34 for holding a rocker arm in position of service. The rocker arm is provided at one end portion with upwardly ranging threaded stop pin 35 which, in the lowering of the armature 28 as aforesaid, is caused to rise into position to inhibit the swinging of the gate member FF so as to open the enclosed space within the casing between the runways a and the consequent discharge of the animal. However, after the animal has been positioned upon the trigger-plate C and the circuit member E a predetermined length of time during which both said elements are energized by high tension electrical fluid from the transformer D, a thermostatic device G is operated to open the circuit through the coil 29 and permit the rocker arm to swing so as to withdraw the stop pin 35 from the lower marginal portion of the gate member FF permitting the electrocuted animal to be discharged laterally and downwardly between the inclined casing members 23 and 23a. The relay device F acts also as master relay. The rocker arm 31 is tied to the armature 28 by an insulating bracket 36, which bracket is tied to the rocker arm at one end by a wire or other flexible connector 37. The stop pin 35 is threaded and provided with jam nuts 38 above and below the rocker arm, whereby it may be adjusted in length above the rocker arm and secured in position of adjustment. A leaf spring 39 is carried by an insulating block 40 mounted upon a relay frame 41, and two other leaf springs 42 and 43 are similarly mounted beneath it, and they are provided with an upper contact point 44, a lower contact point 45 and an intermediate double contact point 46 carried upon the leaf springs so related.

The thermostatic device G includes electrical resistance 47 which is disposed adjacent a thermostatic member 48 composed of laminations of metals of different coefficients of expansion and contraction whereby at a given temperature created by the resistance member 47, distortion of the said thermostat member 48 ensues and it is withdrawn at one end portion from a contact point 49, opening a hitherto closed circuit through the transformer D, the relay F, and the source of electrical energy led to such thermostatic device through the line, including electrical paths 50 and 51.

Through the top member 52 of the casing A is formed an opening 53 provided with a swinging closure 54 which either closes said opening to prevent escape of the animal within the electrocution zone, or, when opened, permits the hand of a person or an implement or device to be inserted to remove it if by any means it has not been discharged laterally from the casing as previously described, or to re-bait the prong 7 upon the trigger-plate C. This closure 54 is pivotally connected with the casing top as at 55 and swings generally in a horizontal plane, and when closed is received at its free end beneath a keeper 56 which securely holds it in closed position. When in such closed position it cooperates with the upper end of an upright push rod 57 which ranges downwardly through the casing top 52 and contacts at its lower end with the plunger 58 of a plunger type switch H carried upon the longitudinal frame member 19 which supports the two bolts 20. The plunger switch is provided with terminals having binding screws 59 from which extend circuit members or wires 50 and 60, one extending to the source of electrical energy, not shown, and the other extending to the thermostatic member 48. It thus happens that when the closure 54 is in closed position, the plunger switch H maintains a closed circuit from the source of electrical energy to the thermostat member 48 which is normally in contact with the contact point 49, thus supplying energy to the transformer and to the relay whereby the electrical features are in condition for service to cause the electrocution of the animal. Surrounding the plunger 58 of the plunger switch H is a compression spring 61 normally urging the plunger and push rod 57 upwardly, which insures an opening of the circuits mentioned when the closure of the casing is opened. The two line wires or circuit wires 50 and 51 are led into the casing through a standard plug and socket connector 62. The transformer D may be grounded on the high tension side as shown at 63, on the casing.

The mode of operation and method of use of the exterminator heretofore described and shown in the drawings will be readily understood from such disclosures taken in connection with the accompanying statement:

The rat or other animal approaching the bait or lure 8 proceeds upwardly through one of the inclined runways or ramps a, and, as stated, the entire apparatus may be located in a zone ordinarily traversed by such animals, as adjacent the baseboard of the wall of a room, and the rat, under such circumstances, as has been found in practice, frequently ascends one of the runways and proceeds to the zone of electrocution even if the bait or lure be omitted from the trigger-plate C. In other words, if the apparatus be installed in the usual haunt or natural runway of the rat, he will enter the apparatus without the invitation of the bait. However, he may proceed to the trigger-plate, and once having placed one or more of his feet thereon, the trigger-plate is depressed at that end portion, rocking at the pivotal mounting or rocker-arm 9, and this brings one of the studs or contact members 16 downwardly into contact with one of the leaf spring contact members 14, whereupon the incoming electrical energy through the wire or path 51 passes through leaf spring 42 and conductor 30 to one of the binding posts 15 and thence through the electric path 14, 13, 27, to the relay device F. Energization of relay 29 causes the armature 28 to be attracted thereto. This closes a circuit through the heating element 47 of the thermostat device G and sets up a warming of the bi-metallic member 48. In this connection it will be noted that there is a connection 43ª between the conductor 27 and the contact spring 43. Consequently, once the circuit of the relay 29 is closed by tilting of the platform C, said circuit remains closed even though the platform C returns to its normal horizontal position. When relay 29 is energized and 42 and 43 thereby are electrically connected, a circuit is completed through the primary coil of the transformer D, which induces high tension in the secondary coil, and the high tension product passes thence through circuit wires 64, 65 and 66 to the circuit member E, which surrounds the trigger-plate on three sides, slightly spaced therefrom, and through the wire or path 22 to the trigger-plate. The circuit member E is slightly spaced at the top from a casing member 67, which constitutes the top portion of the lower casing member aa. Therefore, this casing member top 67 constitutes, at either end of the casing, the last approach of the rat or other animal to the circuit member E and trigger-plate C, and the casing A constitutes the ground 63 at the high tension side of the transformer. It, therefore, results that with the circuit closed through the transformer as above recited, and with the circuit closed through the heating element 47 of the thermostat device, properly timed as to its heating action, the rate will have approached, to set up these conditions, a position in which some part of his anatomy engages the trigger-plate C setting up the aforesaid circuits. The circuit member E is carefully proportioned and dimensioned so that a wide variety of activities or motions of the rat or other animal may occur and still the electrocution be complete. As examples, we may point out that on the direct approach to the trigger-plate from the casing member top 67, the circuit member E is of such predetermined width that a portion of the anatomy of the rat such as one front paw, may come into contact with the trigger-plate, while another portion or paw rests upon the casing top. The trigger-plate is very delicately balanced, and requires but slight pressure by the rat to tilt it and energize the members of the electrical circuits heretofore referred to, an additional member being the coil 29 which attracts its armature 28 and tilts the rocker-arm 31 so as to bring the stop-pin 35 into position to hold the gate FF closed. Likewise, the push rod 57 of the plunger switch H is depressed under pressure by the closure 54, thus maintaining the line circuit closed. Now, if the rat or other animal withdraws its fore paw from one end portion of the trigger-plate, the dimensions of the circuit member are such that parts of his anatomy will still contact therewith and with the casing top 67 in connection with which the high tension side of the transformer is grounded, and an electrocuting circuit will be closed through the rat just as effectively as though he contacted both trigger-plate and casing top. This is of high importance, because many animals and particularly rats, are wily animals and tend to feel their way in unaccustomed surroundings. A mere light touch with the rat's paw to the trigger-plate, as stated, is sufficient to tilt it, and if the rat then continues to maintain that touch and rest in part upon the casing top 67, electrocution occurs; but a withdrawal to only the circuit member E and the casing top 67 is sufficient to produce the same results. It also occurs that the initiation of the electric shock, as we have observed, "kicks" the rat away from the trigger-plate, but if he falls across any part of the circuit member E and any part of the casing A, the electrocution is effective. During the electrocuting period, which is properly timed, it having been found that approximately fifteen seconds of exposure to the current is sufficient, the heating element 47 has reached a temperature sufficient to distort the thermostatic element 48, which retracts it from the contact point 49, thereby opening the line circuit through the relay core 29, and freeing the armature 28 thereof so that it breaks the circuit through the trigger-plate C by way of one of the electric paths 30, and likewise breaks the circuit through the path 63a to the transformer, de-energizing the trigger-plate and circuit member E and casing top 67.

Figure 3:
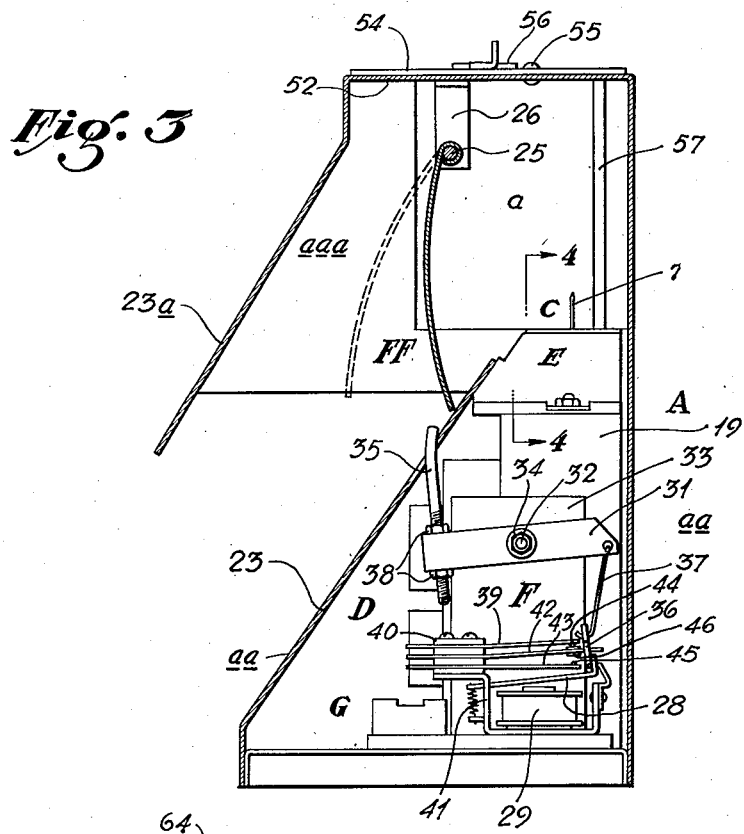
Fig. 3 is a still further enlarged vertical transverse sectional view taken upon the line 3—3, Fig. 2, and looking in the direction of the appended arrows.

Upon the operation of the relay device F to permit the armature 28 thereof to rise, the circuit is broken through the core 29 of the relay device F and its armature 28 rises into the position shown in Fig. 3, the rocker-arm 31 swinging so that the stop-pin 35 clears the lower edge of the gate FF permitting it to swing into the dotted line position in Fig. 3, so that the electrocuted rat may be discharged between the casing members 23 and 23a outwardly of the apparatus. During the use of the mechanism, the closure member 54 is maintained in closed position, which holds the plunger rod 57 down, holding the plunger switch H in closed position, so that the line from the source of electrical supply is closed for purpose of setting up the operative circuits heretofore mentioned. The thermostat device G having been operated as aforesaid to distort the metallic element 48 and open the circuit through the relay F, as we have seen results in a de-energizing of the casing member top 67 and the trigger-plate. The rising of the armature 28 likewise opens up the circuit through the heating element 47 and the metallic member 48 gradually cools and returns to contact with contact point 49, closing the incoming line so that the sequence of energizations and actions above described may be repeated.

It is to be pointed out that the action is so effective that the bait is rarely touched or in any part consumed, and that introduces an element of economy in the service of the mechanism. The economy extends to the servicing of the device, the lack of necessity for frequent rebaiting cutting down such service to a minimum, and the trap is always ready for action and for repeated action, and the sequences of energizations and actions take place automatically and indefinitely without attention or repair or replacement. While the gate FF blocks the exit of the rat's carcass until the full electrocuting period has been completed, such gate FF thereupon is immediately freed and the carcass descends by gravity into the clear outside of the mechanism and entirely out of the zone which the rat traverses in approaching the zone of electrocution and likewise, of course, removes the carcass from that zone. As fast as carcasses are discharged by gravity, the mechanism is freed and ready for successive electrocutions. It will be noted that no electrical energy is consumed while the trap is inactive. Furthermore, the plunger switch H and its rod 57 act as safety devices in that when the closure 54 is swung to clear such plunger, the line circuit is broken and no danger of shock to any person attending to the trap exists.

The casing of the apparatus may be slightly elevated if desired, and it often is so located in service, resting upon pipes or beams traversed by rats, and in that case a suitable receptacle for the discharged carcasses can be provided; but in practice the carcasses, dropping by gravity, tumble some distance away from the bottom of the casing. It is found preferable to utilize a transformer of constant current type.

It will be noted that all of the parts and features of the apparatus are of relatively simple and inexpensive nature and most of the electrical features may be bought from standard stock with such minor additions or variations as may be desirable. The rest of the apparatus is merely sheet metal which may be cut and shaped economically, and minor fittings that go along with the rest of the features are likewise readily obtainable and inexpensive in make-up. Sheet metal and metal stampings comprise practically the entire apparatus in addition to the electrical features.

It is obvious that many changes and variations and departures may be made with respect to the foregoing description and statement and the disclosures of the accompanying drawings, in adapting the invention to varying conditions of use and service, without departing from the spirit of the invention, which latter may be embodied in widely diversified forms.

Having thus disclosed our invention, we claim and desire to secure by Letters Patent:

1. An animal electrocuting device comprising a walkway for the animal, said walkway comprising a fixed section, a section mounted to be tilted by the animal stepping thereon, and a second fixed section interposed between said tiltable section and said first mentioned fixed section, said sections being insulated from each other, a source of high tension current having one terminal connected to said first mentioned fixed section and its other terminal connected to said second mentioned fixed section, switch means controlling supply of current from said source to said fixed sections and having a normal status denying such supply, and means whereby tilting of said tiltable section by an animal stepping thereon causes actuation of said switch means to cause current from said source to be supplied to said fixed sections, thus to effect electrocution of the animal if its body bridges said fixed sections.

2. An animal electrocuting device comprising a walkway for the animal, said walkway comprising a fixed section, a section mounted to be tilted by the animal stepping thereon, and a second fixed section interposed between said tiltable section and said first mentioned fixed section, said sections being insulated from each other, a source of high tension current having one terminal connected to said first mentioned fixed section and its other terminal connected to said second mentioned fixed section and also to said tiltable section, switch means controlling supply of current from said source to said sections and having a normal status denying such supply, and means whereby tilting of said tiltable section by an animal stepping thereon causes actuation of said switch means to cause current from said source to be supplied to said sections, thus to effect electrocution of the animal if its body bridges said first mentioned fixed section and either said tiltable section or said second mentioned fixed section.

3. An animal electrocuting device comprising a walkway for the animal, said walkway comprising a fixed section, a section mounted to be tilted by the animal stepping thereon, and a second fixed section interposed between said tiltable section and said first mentioned fixed section, said sections being insulated from each other, a source of high tension current having one terminal connected to said first mentioned fixed section and its other terminal connected to said second mentioned fixed section, switch means controlling supply of current from said source to said fixed sections and having a normal status denying such supply, means whereby tilting of said tiltable section by an animal stepping thereon causes actuation of said switch means to cause current from said source to be supplied to said fixed sections, thus to effect electrocution of the animal if its body bridges said fixed sections, said tiltable section having a normal position from which it is tiltable to cause said actuation of said switch means, and means whereby supply of current from said source to said fixed sections is maintained following tilting of said tiltable section and return of same to its normal position.

4. An animal electrocuting device comprising a walkway for the animal, said walkway comprising a fixed section, a section mounted to be tilted by the animal stepping thereon, and a second fixed section interposed between said tiltable section and said first mentioned fixed section, said sections being insulated from each other, a source of high tension current having one terminal connected to said first mentioned fixed section and its other terminal connected to said second mentioned fixed section and also to said tiltable section, switch means controlling supply of current from said source to said sections and having a normal status denying such supply, means whereby tilting of said tiltable section by an animal stepping thereon causes actuation of said switch means to cause current from said source to be supplied to said sections, thus to effect electrocution of the animal if its body bridges said first mentioned fixed section and either said tiltable section or said second mentoned fixed section, said tiltable section having a normal position from which it is tiltable to cause said actuation of said switch means, and means whereby supply of current to said fixed and tiltable sections is maintained following tilting of said tiltable section and return of same to its normal position.

5. A device as set forth in claim 1 including an animal confining tunnel above the walkway, said tunnel having a doorway at one side thereof through which an animal electrocuted by the device may gravitate from said walkway, a door controlling said doorway, said door normally being free to open, and means whereby said door is held closed for a predetermined period of time following tilting of said tiltable section and bridging of said fixed sections by an animal and then is released for opening to permit the electrocuted animal to gravitate from the device.

FRANK E. MONTROY.
TOM McGOVERN.
JOSEPH H. GAUTHIER.
HESKETT I. DAWKINS.